United States Patent [19]

Franz

[11] Patent Number: 5,375,191
[45] Date of Patent: Dec. 20, 1994

[54] METHOD FOR APPROXIMATING FULL RESOLUTION COLOR PRINTING

[75] Inventor: Douglas L. Franz, Vancouver, Wash.

[73] Assignee: Hewlett-Packard Company, Palo Alto, Calif.

[21] Appl. No.: 134,519

[22] Filed: Oct. 7, 1993

Related U.S. Application Data

[63] Continuation of Ser. No. 772,767, Oct. 7, 1991, abandoned.

[51] Int. Cl.$^5$ .............................................. G06F 15/00
[52] U.S. Cl. ..................................... 395/109; 358/535
[58] Field of Search ............... 395/109, 101, 117, 112, 395/131; 382/54–56; 358/533–536, 454–457, 459, 298; 345/185–188, 191, 189; 346/157

[56] References Cited

U.S. PATENT DOCUMENTS

| | | | |
|---|---|---|---|
| 4,485,397 | 11/1984 | Schueter et al. | 358/298 |
| 4,930,007 | 5/1990 | Sugiura et al. | 358/298 |
| 5,012,257 | 4/1991 | Lowe et al. | 346/1.1 |
| 5,134,667 | 7/1992 | Suzuki | 382/54 |

FOREIGN PATENT DOCUMENTS

| | | | |
|---|---|---|---|
| 390473 | 10/1990 | European Pat. Off. | 395/109 |
| 400680 | 12/1990 | European Pat. Off. | 395/109 |
| 430451 | 6/1991 | European Pat. Off. | 395/109 |
| WO91/14578 | 3/1991 | WIPO | 395/109 |

*Primary Examiner*—Arthur G. Evans

[57] ABSTRACT

The method approximates full color resolution by combining dot-on-dot (DOD) and dot-next-to-dot (DND) techniques in printing images received from a computer. The method prints with DOD at the edge of an image or in a depleted area within an image and prints with DND elsewhere within the image to conserve printing time and ink. In the method, the color for each dot of the image is stored, and the image is divided into subgroups of four dots each. Each dot is then tested for significance by looking at whether other dots within the group or adjacent to the group are white. The color for each dot is mapped to one or more colors for printing, the mapping depending on the significance status of at least one dot within the subgroup. In this manner the image is checked for solid and depleted areas of color so that the minimum number of dots are printed within each subgroup.

15 Claims, 4 Drawing Sheets

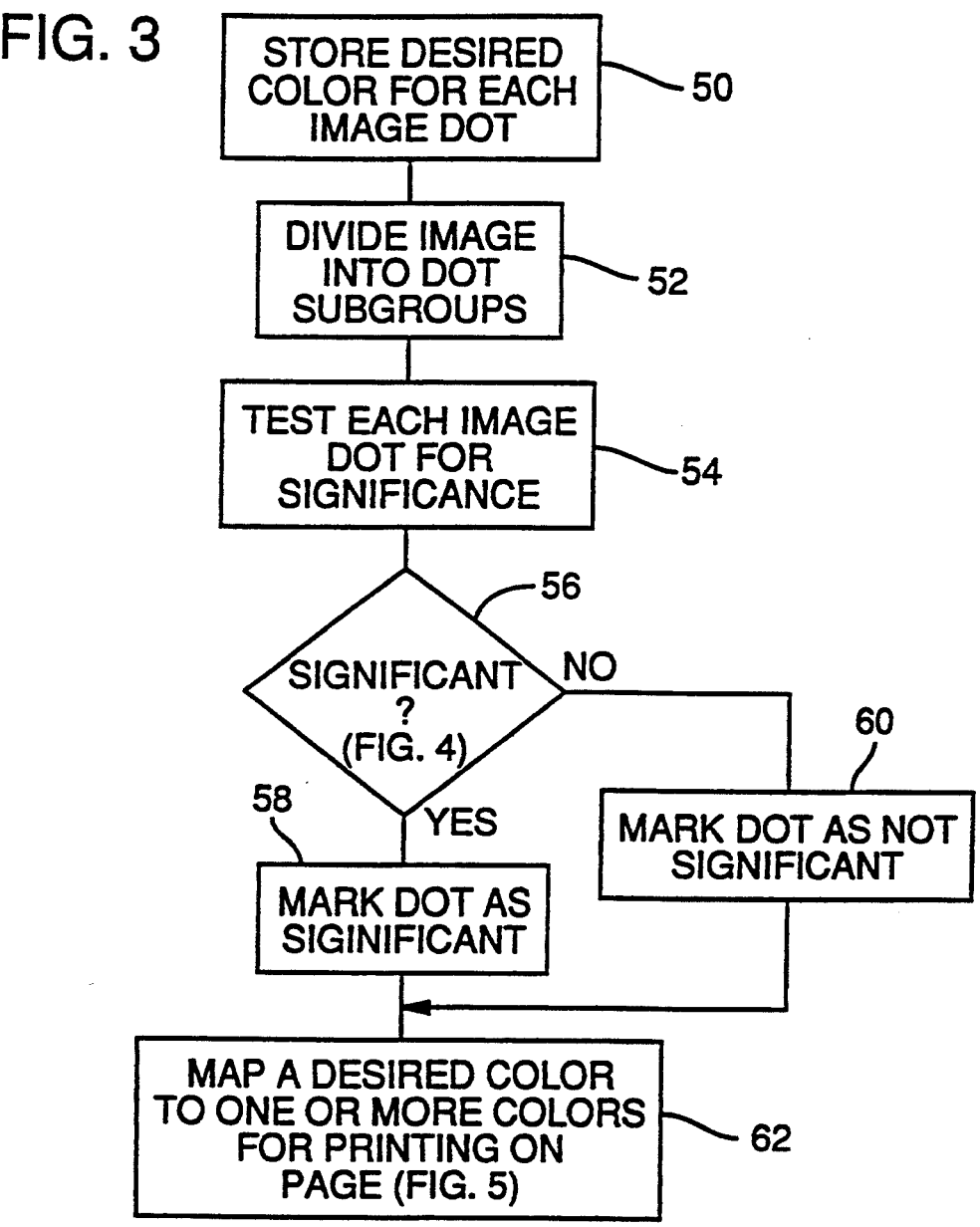
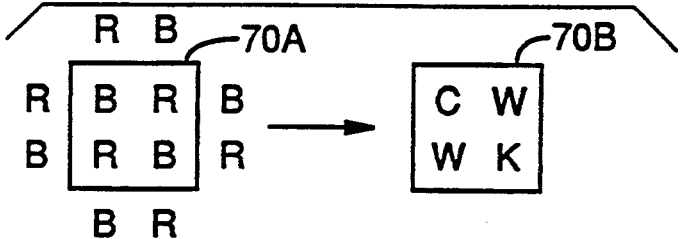
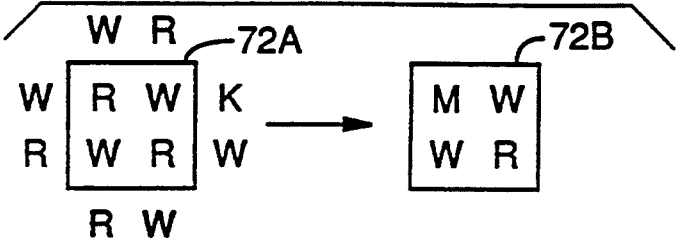

FIG. 4
| NOTATION | DOT LOCATION BEING TESTED | SIGNIFICANT WHEN EQUATION IS TRUE |
|---|---|---|
| <table><tr><td></td><td>A</td><td>B</td><td></td></tr><tr><td>H</td><td>NL</td><td>NR</td><td>C</td></tr><tr><td>G</td><td>JL</td><td>JR</td><td>D</td></tr><tr><td></td><td>F</td><td>E</td><td></td></tr></table> NL | 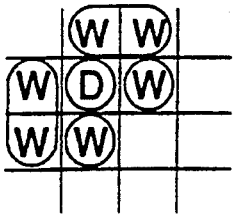 | (H•G) + (A•B) + NR + JL |
| NR | 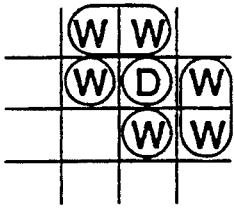 | (A•B) + (C•D) + JR + NL |
| JL | 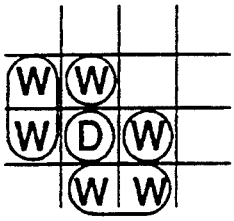 | (H•G) + (F•E) + NL + JR |
| JR | 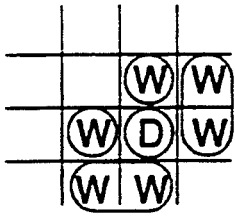 | (C•D) + (F•E) + NR + JL |

METHOD FOR APPROXIMATING FULL RESOLUTION COLOR PRINTING

CROSS REFERENCE TO RELATED APPLICATION(S)

This is a continuation of copending application Ser. No. 07/772,767 filed on Oct. 7, 1991, now abandoned.

BACKGROUND OF THE INVENTION

This invention relates to color printing with a computer printer, color copier or the like. More particularly, this invention relates to a method of providing full resolution, multiple color printing with less ink and at a faster rate than is conventionally required.

Printing resolution is defined by the number of dots printed per inch (dpi), with 300 dpi being typical full resolution. Printing at full resolution is usually done with a dot-on dot (DOD) technique, where colors are generated by printing one or more color dots at each grid point (dot location) on the printing medium such as paper. For primary colors, only one dot is needed for a grid point, but for secondary colors, which are combinations of primary colors, at least two dots of different colored inks are required at a grid point.

The DOD technique has a number of drawbacks. It requires twice as much as ink as desirable to printed at each secondary color dot at a grid point. This results in excessive ink use that can lead to unwanted ink mixing at adjacent grid points and to paper wrinkling. It is also relatively slow, since secondary colors take twice as long to print as primary colors. One modification that can reduce ink use and paper wrinkling is to print each grid point with two dots of half strength. Both primary colors and secondary colors are then printed with two dots. But this approach further slows the rate of printing since every grid point to be printed requires two passes of the printhead.

An alternative to the DOD technique is the dot next to dot (DND) technique. In its conventional form, DND provides the same number of colors as DOD, but not at resolution of DOD. Primary colors are printed as in DOD; secondary colors are printed by placing the requisite primary colors adjacent to each other in a checkerboard or other pattern to give the appearance of secondary color. For example, green, a secondary color, may be printed by forming a pattern of alternating color dots of cyan and yellow on the pattern. The DND technique thus avoids the need to print two colors on a single grid point to create secondary colors. However, the cost is resolution. Images formed of secondary colors with DND are printed with only half the spatial resolution of DOD.

Other printing attempts to print secondary colors include various dithering or error diffusion techniques that require a great deal of software processing, making them relatively slow and complex.

The drawbacks associated with these attempts and with conventional DND are unacceptable for a low cost, high quality color printing device. The present invention, on the other hand, uses a novel printing technique that provides the apparent resolution of DOD without the drawbacks described above.

SUMMARY OF THE INVENTION

An object of the invention, therefore, is to provide an improved printing method that overcomes the drawbacks of prior DOD and DND techniques.

Another object of the invention is to provide a printing method that gives the appearance of full resolution without requiring dot-on-dot printing at each and every grid point.

Yet another object of the invention is to provide such a printing method that prints at full resolution only where necessary to preserve the desired image and at partial resolution elsewhere.

To achieve these objects, a print method according to the invention includes a number of steps. One step stores or otherwise keeps track of the color desired for each dot of an image to be printed on a page. Another step divides the image into subgroups of dots. A third step determines if a dot within a subgroup should be marked as "significant" by comparing the colors desired for the other dots within the subgroup. A fourth step maps, i.e., transforms, a desired color to one or more colors for printing on the page. What colors are printed on a grid point depends upon the significance status of at least one dot within the subgroup.

In a preferred embodiment of the method, the subgroups are two row-by-two column squares of four dots each, each square having row, column and diagonal dots for reference. The determining step then includes determining if either the adjacent row or column dot is white.

The mapping step in the preferred embodiment depends first on which dot of the subgroup is being scrutinized and then follows an If-Then-Else test specific for that dot. The test looks at whether one or more dots of the subgroup are significant and maps a desired color to one or more colors depending on the outcome of the test.

The foregoing and other objects, features, and advantages of the invention will become more apparent from the following detailed description of the preferred embodiment which proceeds with reference to the accompanying drawings.

BRIEF DESCRIPTION OF THE DRAWINGS

FIG. 3 is a flowchart illustrating a printing method according to the invention.

FIG. 4 is a logic diagram illustrating how a dot is tested for significance.

FIG. 6 is an example of how the method of the invention works for a solid area within an image.

FIG. 7 is an example of how the method of the invention works for a depleted area within an image.

DETAILED DESCRIPTION OF A PREFERRED EMBODIMENT

Figure 1:
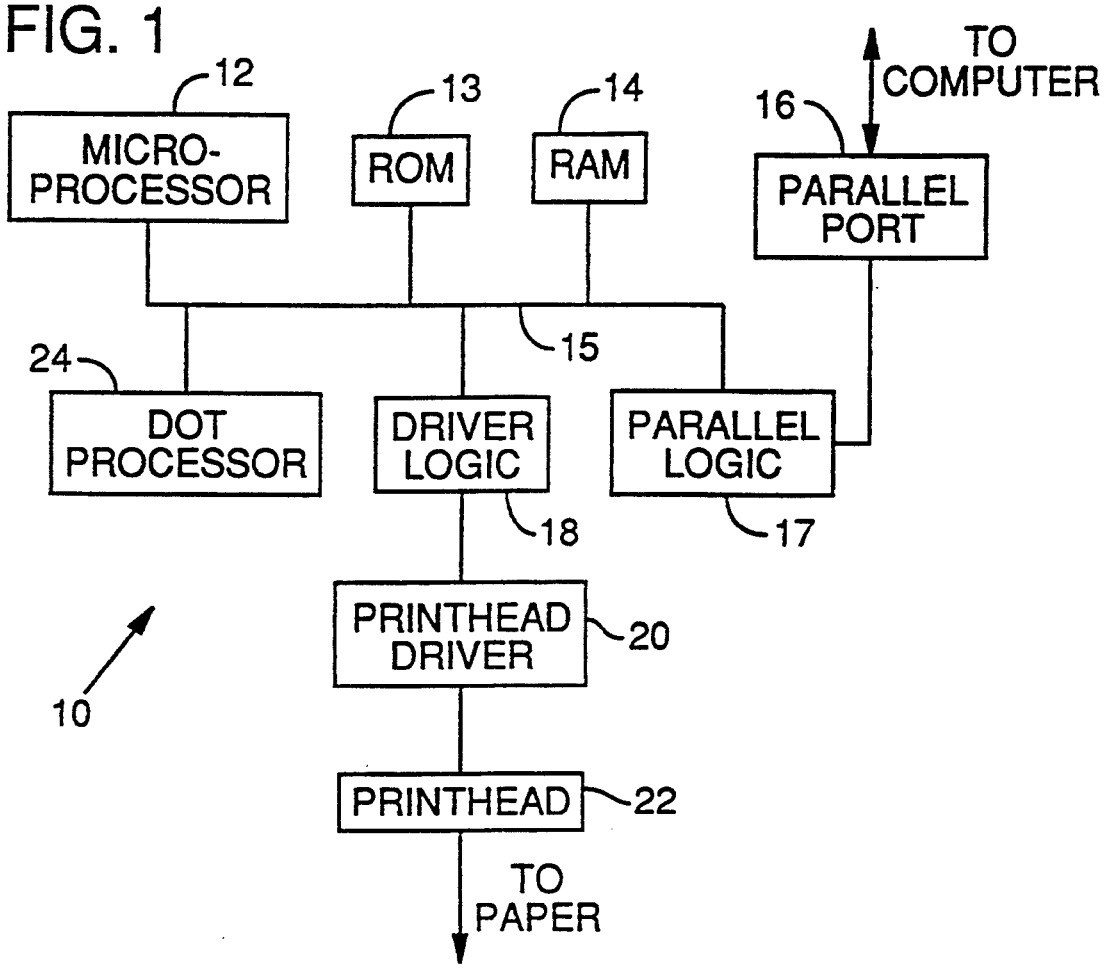
FIG. 1 is a block diagram of a printing circuit according to the invention.

Referring now to FIG. 1, there is shown a block diagram of an electronic circuit 10 in accordance with the invention. The circuit 10 is preferably located within a printing device such as a computer printer or a photocopier. The circuit includes a microprocessor 12 which receives instructions from a ROM 13 and writes to and reads data from a RAM 14 through buses represent by a bus 15. In the case of a printer, an image to be printed is communicated from a computer (not shown) to circuit 10 through a bidirectional port such as parallel port 16. Data from port 16 is accepted by parallel logic 17 which alerts processor 12 to the data's presence. Processor 12 then controls the bus 15 to store the data within an input buffer in RAM 16. Driver logic 18 receives printing information from RAM 16 and generates printing signals that are routed to printhead drivers 20 which drive a printhead 22 on the printer. Drivers 20 are of conventional design, such as Darlington transistor pairs. Printhead 22 may be one of any number of known printheads for printers.

In the present embodiment, part of the inventive method is implemented in the hardware of a dot processor 24 connected to bus 15, and part is implemented in the software executed by the microprocessor 12. The tradeoff is cost versus speed, with the faster (and presently more costly) choice being hardware. It will be understood by those skilled in the art that the claimed invention could be implemented in a number of combinations of hardware and software. In one extreme, the invention could be incorporated in the computer rather than the printing device. The description herein of the present embodiment is therefore intended only as a preferred example of the invention and not as a limitation on the scope of the claims.

Figure 2:
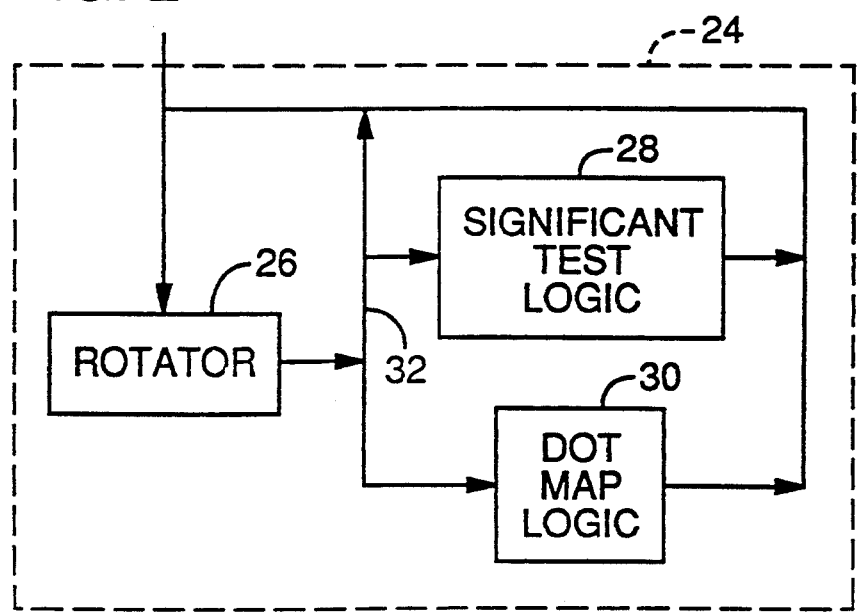
FIG. 2 is a further block diagram of a dot processor block within FIG. 1.

FIG. 2 is a block diagram of the circuitry of the dot processor 24. The method for approximating full resolution color printing is principally carried out in the dot processor. Its hardware operation is briefly described herein as a preface to a more detailed description of the method steps. The dot processor includes a rotator block 26, a significance test logic block 28, and a dot map logic block 30 representing circuitry. The blocks 26, 28 and 30 are interconnected by an internal bus 32, with data flow between the blocks indicated by arrows. The rotator 26 rotates horizontally formatted data to vertical formatted data for the printhead 22. The rotator is also used to temporarily store data for input to the significance test logic 28 and to dot map logic 30. The significance test logic 28 is a hardware implementation of the significance testing algorithms shown in FIG. 4, to be described, as well as a translator of the color data sent by the computer into a format understood by the printer. The hardware of the dot map logic 30 performs the If-Then-Else tests shown in FIG. 5, including the assigning of the appropriate color map per tables II, III and IV, also to be described.

Complete data flow through the dot processor 24 takes three cycles under control of the processor 12. In the first cycle, the rotator 26 is loaded with four vertically adjacent row segments of data from the input buffer of RAM 16. As known in the art, the row segment is a horizontal portion of a complete raster row across a page to be printed. Each row segment is 16 dots in length. The four vertically adjacent segments thus represent 16 columns of dots to be printed. Each dot's color information is encoded with three or four bits, often referred to in the art as multiple bit planes. The significance test logic serially processes through the 16 dots of the row segments column-by-column, simultaneously evaluating one dot from each of the four rows. The output of the test logic 28 evaluation is four bits for each dot: a cyan bit, a magenta bit, a yellow bit, and a significant bit. An additional white bit is generated for the bottom row segment for use in significant testing of adjacent, lower row segments in subsequent printing. The far right column of dots in the rotator 26 is also checked for white dots for significant testing of the adjacent right row segment. Any of the three color bits is set when the corresponding color is to be printed at the dot location. The significant bit is set when the dot location is determined to be significant. The white bit is set when the bottom dot location of the four dots is not cyan, magenta, or yellow. Seventeen 16-bit words (the white bits being placed in a separate word) are then directed from the significant test logic 28 to RAM 16. Each color word is thus comprised of repeating cyan, magenta, yellow, and significant bits arranged in a column.

The second cycle of data flow is through the dot map logic 30. The 16 color words from the significant test logic 28 are loaded from RAM 16 into the rotator block 26, now rotated so that the words are vertically oriented. Each column is comprised of one type of color bit or of significant bits, there being four cyan columns, four magenta columns, four yellow columns, and four significant columns of bits. From the rotator 26, the data is serially processed column-by-column in the manner shown in FIG. 5 and described herein through the dot map logic 30. The output of block 30 is 16-bit words: 4 cyan, 4 magenta, 4 yellow, and 4 black. These words, which correspond to the original four horizontal dot row segments, are then stored in RAM 16.

The third cycle of data flow again rotates the data from a horizontal format to a vertical format so that the data is properly oriented for the printhead 22. The words generated by the dot map logic 30 are read from RAM 16, rotated, and routed to drive logic 18 for generating printing signals for the printhead 22. In this process, each color column is rotated separately and sent to the appropriate nozzle on the printhead 22.

Referring now to FIG. 3, the flowchart illustrates the steps of the approximation method. Each step in FIG. 3 is referenced herein by parenthetical numerals. Before the method begins, it is assumed that circuit 10 has stored an image to be printed on a page. This image is composed of pixels, i.e., dots, each dot being one of eight desired colors: four primary, three secondary and white. White is the paper color, i.e., the color of a depleted area within or of an area adjacent to the edge of the image. For example, four typical primary colors are cyan, magenta, yellow, and black. Secondary colors, which are mixtures of the primary colors, are blue, green and red. Shades of colors in an image are represented by the computer as intermixed patterns of primary and secondary colors. For example, pink may be represented as alternating red and white dots. The desired color for each dot of the received image is stored for further processing (50).

The image is divided or otherwise broken into predetermined subgroups of dots (52). This step is performed in the present embodiment within circuit 10 by the combined action of processor 12 and rotator 26, although it is possible to perform this step equivalently within the computer as well. In the present embodiment the subgroup is a two row-by-two column square of four dots each. The square forms, in effect, a superpixel. Dots within each square will hereafter be identified relative to a given dot as adjacent row, adjacent column and diagonal dots. For example, the adjacent row dot to a dot in the first row, first column location dot is the first row, second column dot. The diagonal dot to the first row, first column dot is the second row, second column dot. Other subgroups are possible, but the square is preferred for its simplicity.

Each dot in a subgroup is then tested for significance (54). As used herein, the term "significance" refers to a dot that must be printed, though not necessarily with the desired color. Significant dots, as will be shown, are those that are partially or completely surrounded by white dots (a depleted area within an image) and thus a color dot must be printed to sufficiently define the image. Nonsignificant dots (those in a solid area within an image) may or not be printed, depending on the outcome of a mapping step to be described.

FIG. 4 is a diagram illustrating visually and with corresponding Boolean equations whether each dot in a square-type subgroup is significant. Notation for the terms in FIGS. 4–6 appears in Table I below:

TABLE I

| NOTATION | |
|---|---|
| ! | not |
| sig | dot is significant |
| W | dot is white |
| K | dot is black |
| | if dot is not significant, merge dot located at arrow tail into dot located at arrow point |
| JI | print a major map dot |
| NI | print a minor map dot |
| M | print a merged dot |
| D | dot being tested for significance |
| NL | minor left (first row, first column) |
| NR | minor right (first row, second column) |
| JL | major left (second row, first column) |
| JR | major right (second row, second column) |

Each dot is tested (56). If any term in the Boolean equation corresponding to the dot is true, then the dot is marked as having significant status (58). For example, the minor left dot NL is significant is the desired color for a bordering row (A.B) or column (H.G) of dots in an adjacent square is white. A "bordering" row or column is defined here as one adjacent to the dot being tested. Dot NL is also significant if the desired color of either of the adjacent row (NR) or column (JL) dots within the square is white. A similar test for significance is applied to the minor right dot NR, the major left dot JL, and the major right dot JR. The tests differ only in the identity of the bordering row and columns of dots in adjacent squares and the adjacent row and column dots within the square. From the standpoint of an image, dots on the edge of an image are deemed significant since they have bordering rows or columns of white dots. Dots within an image are significant if certain other dots within the same subgroup are desired white (i.e., a depleted area). However, where all the dots within a subgroup are desired nonwhite and the dot being tested is not at the edge of an image, then no dot is significant and none need necessarily be printed.

If none of the terms in the corresponding Boolean equation is true, then a dot is marked or otherwise noted as not significant (60).

Figure 5:
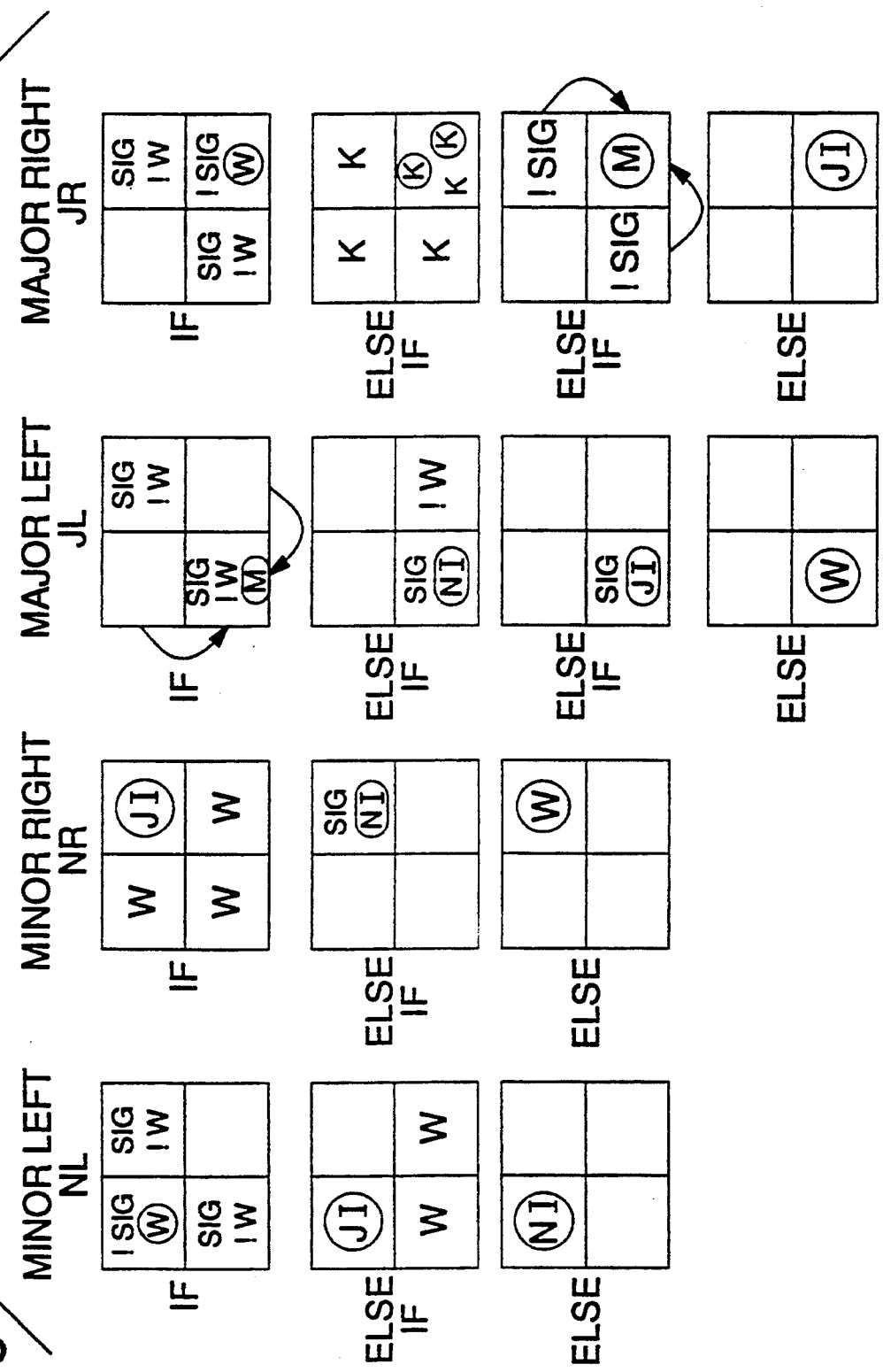
FIG. 5 is a logic diagram illustrating If-Then-Else tests for determining to what color a desired color for a dot is mapped.

The last step shown in FIG. 3 is the mapping of the desired color in the image to one or more colors for the printed dot (62). The term "mapping" is defined here as transforming a desired color to one or more colors (including white) actually printed for a dot. In the case of white, nothing is actually printed on the page since the paper is assumed to be white. The mapping step in the present embodiment is carried out by If-Then-Else tests that are specific for each dot of a subgroup. These tests are illustrated in FIG. 5, with the notation therein explained in Table I above. The terms JI, NI and M in FIG. 5 refer to the mapping tables in Tables II–IV below:

TABLE II

MAJOR MAP TABLE (JI)

| | Color(s) Assigned | | | |
|---|---|---|---|---|
| Desired Color | Cyan | Yellow | Magenta | Black |
| Black | | | | X |
| Red | | X | X | |
| Green | X | X | | |
| Yellow | | X | | |
| Blue | X | | X | |
| Magenta | | | X | |
| Cyan | X | | | |
| White | | | | |

TABLE III

MINOR MAP TABLE (NI)

| | Color(s) Assigned | | | |
|---|---|---|---|---|
| Desired Color | Cyan | Yellow | Magenta | Black |
| Black | | | | X |
| Red | | | X | |
| Green | X | | | |
| Yellow | | X | | |
| Blue | X | | | |
| Magenta | | | X | |
| Cyan | X | | | |
| White | | | | |

TABLE IV

MERGE TABLE (M)

(C, G or B)  $C_{NL} + C_{NR} + C_{JL} + C_{JR} = C_M$
(M, R or B)  $M_{NL} + M_{NR} + M_{JL} + M_{JR} = M_M$
(Y, G or R)  $Y_{NL} + Y_{NR} + Y_{JL} + Y_{JR} = Y_M$
$C_M \cdot M_M = B$
$C_M \cdot Y_M = G$
$M_M \cdot Y_M = R$
$Y_M \cdot C_M \cdot M_M = K$ Each table maps a desired color to one or more colors for a dot.

Pseudocode for each If-Then-Else test of a square is included in Appendix A. Following is a brief description of each test's procedure.

Turning first to the test for the minor left dot NL, if dot NL is not significant and the adjacent row and column dots are significant and are nonwhite desired colors, then dot NL, regardless of its desired color, is mapped to white.

If the "if" requirements are not met, then the adjacent column dot JL and the diagonal dot JR are checked to determined if both are desired white. If so, then the desired color for dot NL is mapped to the color(s) or colors listed in the major map table, Table II. For example, if dot NL is desired red, then the printer is instructed to print both a yellow dot and a magenta dot at the location of dot NL. This is full resolution printing.

If the "then" requirements are also not met, then the desired color for dot NL is mapped to the color listed in the minor map table, Table III. Note that white is a desired color in both tables, so that dot NL could be printed as any of eight colors if mapped to the major map table and any of five colors if mapped to the minor map table.

The use of minor and major map tables is known as asymmetric area depletion (AAD), since the depletion of colors from an image depends on the dots location within the superpixel. AAD limits the number of color dots printed in a superpixel to three, saving ink and time. Alternatively, the minor map table (NI) may be discarded if it is believed that the time and ink required in mapping all desired colors to the major map table is justified. The use of a single, major map table is know as symmetric area depletion (SAD) since the depletion of colors from an image is symmetric within the superpixel. SAD allows up to four color dots printed in a superpixel. If the minor map table is discarded, all references in FIG. 5 to NI should be replaced with references to JI.

For the minor right dot NR, the test is slightly different. If all of the other dots within the square are white, then map the desired color of dot NR to the color or colors listed in the major map table.

If that is not the case, then if dot NR is significant map the desired color of the dot to the color listed in the minor map table.

If that requirement is also not met, then map the desired color to white.

For the major left dot JL, the test includes mapping with a merge step. Merging is employed where adjacent dots share the same primary color, either solely as the primary or included in a secondary color. For example, the primary color yellow is included in the color yellow as well as in the secondary color green. Only nonsignificant dots may be merged.

If the dot JL and the diagonal dot NR are both significant and nonwhite, then map the desired colors of the other two dots NL and JR into the dot JL as set forth in the merge table (Table IV) and in the respective Boolean equations in Appendix A. Each of the dots to be merged is first checked to see if it includes a primary color. For example, if any of the dots includes cyan, or the secondary colors green and blue that include cyan, that fact is noted as $C_m$. The merged dots are then checked for the presence of magenta ($M_m$) and yellow ($Y_m$) as well. Whatever primary colors $C_m$, $M_m$, $Y_m$ are found are then combined. If all three are present, then the desired color is mapped to black. In a two-pen printer, where one pen is black and the other pen has three non-black colors, the desired color would be mapped to blue. This change is preferred because the dedicated black pen may be misaligned with the color pen and miss the desired dot location if used to print a black dot. The color pen should then print blue, which blends with the black. If only two of the three are present, then the desired color is mapped to the resulting secondary color. If only one of the three is present, then the desired color is mapped to the primary color. If none of the three is present, the desired color is mapped to white.

If the above requirements are not met, the status of dot JL is checked for significance and the adjacent row dot is checked to see if it is desired white. If so, then the desired color is mapped to the color found in the minor map table.

If neither of the two requirements above is met, then the status of dot JL is checked for significance. If found to be significant, its desired color is mapped to the color or colors of the major map table.

If none of the three requirements above is met, the desired color of dot JL is mapped to white.

For dot JR, the test is again different. If the adjacent row and column dots are both significant and desired nonwhite and dot JR is not significant, then map the desired color of dot JR to white.

If this requirement is not met, check if the desired color of each of the dots in the square is black. If so, then double blacken dot JR (indicated by two circled k's).

If neither of these requirements is met, then check if dots NR and JL are not significant. If so, merge the desired color of dot JR with the colors of adjacent row and column dots NR and JL as set forth in the merge table (Table IV) and the respective Boolean equations in Appendix A.

If none of these requirements is met, then check if dot NR alone is not significant. If so, then merge the desired color of dot JR with the color of dot NR. If still no requirement is met, check if dot JL alone is not significant. If so, then merge the desired color of dot JR with the color of dot JL.

If none of the above requirements is met, then map the desired color of dot JR to the color or colors listed in the major map table.

The method described above is best understood by example. Assume that the image transmitted by the computer to the printer has an internal area of alternating red and blue dots, as shown by a square subgroup 70A in FIG. 6, and another internal area of alternating red and white dots to form pink, as shown by a square subgroup 72A in FIG. 7. The colors actually printed on the page are shown in squares 70B and 72B.

Testing first for significance, it can be seen from FIG. 4 that none of the dots in square 70A is significant since no white dots appear within the square 70A or in the bordering rows and columns of dots. However, in square 72A the red dots are marked as significant since they are each bordered by a white row and white column dot.

With significance determined, the mapping step is executed for square 70A in FIG. 6. Referring to FIG. 5, the desired color of dot NL, which is blue in square 70A, is mapped to the color cyan listed in the minor map table (Table III). The desired color of dot NR, which is red, is mapped to white. The desired color of dot JL is also mapped to white. The desired color of dot JR is the merging of dots JL, NR, and JR. From the merge table (Table IV), it can be seen that all three primary colors are present. The desired blue of dot JR is thus mapped to black. The square 70B of FIG. 6 is the outcome of the method, illustrating how the printing of three color dots on two dot locations in the square replaces what otherwise would require eight printed dots with the conventional full resolution DOD technique. If SAD were preferred and the minor map table replaced with the major map table, four color dots would have been printed, with the blue dot being mapped to both cyan and magenta. This is still a considerable savings in ink and printing time over conventional DOD.

For square 72A in FIG. 7, the desired color of dot NL is also mapped to a color (magenta in this instance) in the minor map table. The desired color of dot NR is mapped to itself, white. The desired color of dot JL, white, is also mapped to itself. And the desired color of dot JR, red, is the merge of dots JL, JR, and NR. Dots JL and NR are white and thus have no primary colors from the merge color table. Dot JR is red, and is thus mapped to its primary colors magenta ($M_m$) and yellow ($Y_m$). Combining these colors provides the red itself. The square 72B in FIG. 7 is the outcome of the method, illustrating how the printing of three color dots on two dot locations in the square preserves the resolution provided by the conventional DOD technique for such colors. With conventional DND, however, the resolution would be quite poor, with each square consisting of a row of white dots and a row of alternating yellow and magenta dots. If SAD were preferred and the minor map table were replaced with the major map table, the dot NL is mapped to yellow and magenta. The present method and conventional DOD provide identical results in the SAD case.

Having illustrated and described the principles of the invention in a preferred embodiment, it should be apparent to those skilled in the art that the invention can be modified in arrangement and detail without departing from such principles. I claim all modifications and equivalents coming within the spirit and scope of the following claims.

| NOTATION | |
|---|---|
| XXSIG | XX IS A SIGNIFICANT DOT |
| XXW | XX IS A WHITE DOT |
| — | NEGATION |
| W | PRINT A WHITE DOT |
| JI | PRINT A MAJOR MAP DOT |
| NI | PRINT A MINOR MAP DOT |
| XX(M) | PRINT A MERGE DOT XX |
| XXK | XX IS A BLACK DOT |
| MINOR LEFT = NL | IF (NLSIG·NRSIG·JLSIG·NRW·JLW) THEN NL = W<br>ELSE IF (JLW·JRW) THEN<br>    NL = JI<br>ELSE<br>    NL = NI |
| MINOR RIGHT = NR | IF (NLW·JLW·JRW) THEN<br>    NR = JI<br>ELSE IF NRSIG THEN<br>    NR = NI<br>ELSE<br>    NR = W |
| MAJOR LEFT = JL | IF (NRSIG·JLSIG·NRW·JLW) THEN<br>  IF (NLSIG·JRSIG) THEN<br>    JL = NL(m)·JR(m)·JL(m)<br>  ELSE IF NLSIG THEN<br>    JL = NL(m)·JL(m)<br>  ELSE IF JRSIG THEN<br>    JL = JR(m)·JL(m)<br>ELSE IF (JLSIG·JRW) THEN<br>    JL = NI<br>ELSE IF JLSIG THEN<br>    JL = JI<br>ELSE<br>    JL = W |
| | APPENDIX A - Page 1 of 2 |
| MAJOR RIGHT = JR | IF (JLSIG·NRSIG·JLW·WRW·JRSIG) THEN JR = W<br>ELSE IF (NLK·NRK·JLK·JRK) THEN<br>    JR = K·K<br>ELSE IF (NRSIG·JLSIG) THEN<br>    JR = NR(m)·JL(m)·JR(m)<br>ELSE IF (NRSIG) THEN<br>    JR = NR(m)·JR(m)<br>ELSE IF (JLSIG) THEN<br>    JR = JL(m)·JR(m)<br>ELSE<br>    JR = JI |
| | APPENDIX A - Page 2 of 2 |

I claim:

1. A method of approximating full resolution color printing of an image comprised of dots, each dot being one of a number of possible colors including the primary colors, black, and white the method comprising the following steps:
   storing the color for each dot of an image to be printed;
   dividing the image into at least two-by-two squares of four dots each, each dot in the square having adjacent row, column and diagonal dots within the square;
   for each dot in a square, determining if the dot is significant and therefore must be printed by determining if either of the dot's adjacent row or column dots is white; and
   individually mapping the color for each dot within a square to one or more colors for printing, the mapping depending on which dots in the square are determined to be significant.

2. The method of claim 1 wherein the mapping step comprises the following consecutive steps for a first row, first column dot:
   if the dot is not significant and the adjacent row and column dots are significant and are nonwhite colors, then map the color of the dot to white;
   if the adjacent column dot and the diagonal dot are both white, then map the color to only one color; and
   otherwise, map the color to one or more colors.

3. The method of claim 1 wherein the mapping step comprises the following consecutive steps for a first row, second column dot:
   if the other dots within the square are white, then map the color of the dot to one or more colors;
   if the dot is significant, then map the color to only one color;
   otherwise, map the color to white.

4. The method of claim 1 wherein the mapping step comprises the following consecutive steps for a second row, first column dot:
   if the dot and the diagonal dot are both significant and nonwhite colors, then merge the colors of the other two dots into the color of the dot;
   if the dot is significant and the color of the adjacent row dot is nonwhite, then map the color to only one color;
   if the dot is significant, then map the color to one or more colors; and
   otherwise, map the color to white.

5. The method of claim 4 wherein the merging step comprises:
   for each primary color, determining if any of the colors of three dots includes a primary color or a secondary color that includes the primary color;
   designating each primary color so included; and
   combining the designated primary colors to produce a color for the dot.

6. The method of claim 1 wherein the mapping step comprises the following consecutive steps for a second row, second column dot:
   if the adjacent row and column dots are both significant and nonwhite colors and the dot is not significant, then map the color to white;
   if the color of all the dots is black, then map black to black;
   if either or both of the adjacent row and column dots is not significant, merge the colors of the dot and the adjacent row and column dots that are not significant; and
   if none of these requirements is met, map the color to one or more colors.

7. The method of claim 1 wherein in multiple pen printing having a black pen and a three color pen, a color mapped to black is instead mapped to blue.

8. A method of approximating full resolution color printing of an image comprised of dots, each dot being one of a number of possible colors including the primary colors, black, and white, the method comprising the following steps:

storing the color for each dot of an image to be printed;

dividing the image into subgroups of dots for determining if a dot is adjacent to an edge of the image or is adjacent to a depleted area within the image;

if the dot is adjacent to either an image edge or a depleted area, printing the dot with full color resolution by printing one or more colors to reproduce fully the stored image color for the dot; and if the dot is not adjacent to either an image edge or a depleted area, printing the dot with partial color resolution by printing primary color dots at adjacent dot locations to give the appearance of a secondary color at the two locations.

9. The method of claim 8 wherein printing the dot with full color resolution comprises printing one or more color dots on a same dot location to produce the color at the dot location.

10. The method of claim 8 wherein printing the dot with full or partial resolution comprises printing only one color dot at a dot location if an adjacent dot of the image is not white.

11. The method of claim 8 in which a depleted area of an image is a white area of the image.

12. A method of approximating full resolution color printing of an image comprised of dots which are one of a number of possible colors, including the primary colors, black, and white, the method comprising the following steps:

storing the color for each dot of an image to be printed;

dividing the image into at least two-by-two squares of four dots each, each dot in the square having adjacent row, column and diagonal dots within the square;

determining if a dot within a square is adjacent to a depleted area within the image by determining if either of the dot's adjacent row and column dots is white;

if the dot is adjacent to a depleted area, printing the dot with full color resolution by printing one or more colors to reproduce fully the stored image color for the dot; and if the dot is not adjacent to a depleted area, printing the dot with partial color resolution by printing primary colored dots at adjacent dot locations.

13. The method of claim 12 wherein a dot determined to be adjacent to a depleted area is marked as significant, the method including:

mapping the color for each dot of a subgroup to one or more colors for printing on the page, the mapping depending on the significance status of a dot within the subgroup.

14. The method of claim 12 wherein printing the dot with full or partial resolution comprises printing only one color dot at a dot location if an adjacent dot of the image is not white.

15. The method of claim 1 wherein the step of determining if the dot is significant includes determining if at least two dots in squares adjacent to the dot are white.

* * * * *